(12) United States Patent
Ohara et al.

(10) Patent No.: US 7,557,842 B2
(45) Date of Patent: Jul. 7, 2009

(54) IMAGE PROCESSING CIRCUIT AND IMAGE PROCESSING METHOD

(75) Inventors: Kunihiro Ohara, Kasugai (JP); Tomohiro Fukuoka, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 564 days.

(21) Appl. No.: 11/377,289

(22) Filed: Mar. 17, 2006

(65) Prior Publication Data

US 2007/0139540 A1    Jun. 21, 2007

(30) Foreign Application Priority Data

Dec. 20, 2005    (JP)    ............... 2005-367064

(51) Int. Cl.
H04N 9/083    (2006.01)
H04N 5/228    (2006.01)
G06K 9/00     (2006.01)

(52) U.S. Cl. ............... 348/280; 348/222.1; 382/167

(58) Field of Classification Search ............. 348/221.1, 348/302, 272, 273, 277, 280, 281, 222.1
See application file for complete search history.

(56) References Cited

U.S. PATENT DOCUMENTS 3,382,317 A * 5/1968 Sandler ............... 348/741

5,587,746 A * 12/1996 Nakakuki ............... 348/708
6,078,307 A    6/2000 Daly
6,343,146 B1 * 1/2002 Tsuruoka et al. ............ 382/163
2003/0035673 A1 * 2/2003 Yamakawa ............... 400/76
2005/0200723 A1    9/2005 Kondo et al.

FOREIGN PATENT DOCUMENTS

JP    2001-245141 A    9/2001

\* cited by examiner

*Primary Examiner*—Nhan T Tran
*Assistant Examiner*—Trung Diep
(74) *Attorney, Agent, or Firm*—Arent Fox LLP.

(57) ABSTRACT

An object is to provide an image processing circuit and an image processing method which can use various technologies for a bayer array CCD even when an RGB independent array CCD is used, and can accommodate for the bayer array CCD. A first matrix acquiring circuit 21G acquires an R signal for each basic matrix, and a first averaging circuit 31G outputs an average value AveCH1 of the R signal. Similarly, a second matrix acquiring circuit 22G acquires a G signal, and a second averaging circuit 32G outputs an average value AveCH2 of the G signal. Further, similarly, a third matrix acquiring circuit 23G acquires a B signal, and a third averaging circuit 33G outputs an average value AveCH3 of the B signal. A data array conversion circuit 40G converts the average values AveCH1 through AveCH3 into a conversion matrix of two pixels×two pixels in bayer array. The conversion matrix is detected by a detection circuit 70 for bayer array.

9 Claims, 7 Drawing Sheets

CIRCUIT DIAGRAM OF IMAGE PROCESSING CIRCUIT 1

FIG. 1 PRINCIPLE DIAGRAM OF PRESENT INVENTION

FIG. 2 CIRCUIT DIAGRAM OF IMAGE PROCESSING CIRCUIT 1

FIG. 3  CIRCUIT DIAGRAM OF FIRST IMAGE PROCESSING CIRCUIT BLOCK CH1

SCHEMATIC VIEW OF RGB INDEPENDENT ARRAY SENSOR

VIEW SHOWING OPERATION OF FIRST IMAGE PROCESSING CIRCUIT BLOCK CH1

FIG. 6

SCHEMATIC VIEW OF BAYER ARRAY SENSOR

| R | Gr | R | Gr |
|---|----|---|----|
| Gb | B | Gb | B |
| R | Gr | R | Gr |
| Gb | B | Gb | B |

→ R,Gr,R,Gr,Gb,B,Gb,B · · ·

CIRCUIT DIAGRAM OF IMAGE PROCESSING SYSTEM 100 IN CONNECTION WITH PRIOR ART

IMAGE PROCESSING CIRCUIT AND IMAGE PROCESSING METHOD

CROSS-REFERENCE TO RELATED APPLICATIONS

This application is based upon and claims the benefit of priority from each of the prior Japanese Patent Application No. 2005-367064 filed on Dec. 20, 2005, the entire contents of which are incorporated herein by reference.

BACKGROUND OF THE INVENTION

1. Field of the Invention

The present invention relates to an image processing circuit, and more particularly to an image processing circuit capable of processing image signals even when an RGB-independent array sensor is used as a solid-state image pick-up device.

2. Description of Related Art

FIG. 7 is a block diagram of an image processing system 100 in connection with the related art. The image processing system 100 includes a CCD 190, an image correction circuit 151, a one-line memory 129, latch circuits 125 through 128, and a detection circuit 171. The CCD 190 is a CCD in bayer array. The pixel data accumulated on the pixels of the CCD 190 is inputted into the image correction circuit 151, the one-line memory 129, the latch circuits 127 and 128. The one-line memory 129 holds R, Gr signals on a one preceding line. Gb, B signals on current line inputted subsequently to the preceding line, and the R, Gr signals on the preceding line stored on the one-line memory 129 are simultaneously with each other acquired, and inputted into the detection circuit 171. The detection circuit 171 performs a detection such as color-shade adjustment, exposure adjustment and autofocus, and then, a detection result DR100 is outputted. The image correction circuit 151 performs various corrections such as defective pixel correction, noise correction and OB (Optical Black) correction for the pixel data thus inputted. Then, the pixel data CPD after being corrected is outputted from the image correction circuit 151 to a circuit, not shown, at the next step.

As a technique related to the above, Japanese unexamined patent publication No. 2001-245141 is disclosed.

SUMMARY OF THE INVENTION

However, the conventional image processing system 100 has a problem because the system accommodates for only the CCD image sensor in bayer array, so that it cannot use the so-called RGB independent array sensor (for example, the image sensor from Foveon Inc., in USA) capable of fetching all R, G, B colors by one pixel.

Changing the circuit configuration of the detection circuit 171 so as to accommodate for the RGB independent array sensor causes a first problem because another design is required, leading to increased cost; a second problem because various technologies such as the software library having been grown for many years for bayer array cannot be used; and a third problem because the detection circuit 171 after being changed cannot accommodate for the data in bayer array.

The present invention is made to solve at least one of the problems of the above-mentioned background art and it is an object of the invention to provide an image processing circuit and an image processing method which are capable of using various technologies such as the software library having been grown for many years for bayer array even when the so-called RGB independent array-type solid-state image pick-up device is used, and capable of accommodating for a solid-state image pick-up device in bayer array.

To achieve the purpose above, according to one aspect of the invention, there is provided an image processing circuit comprising: first through third matrix acquiring circuits for acquiring a basic matrix of two pixels×two pixels adjacent to each other on a solid-state image pick-up device from an output signal of the solid-state image pick-up device; a first averaging circuit for calculating an average value of the basic matrix obtained in the first matrix acquiring circuit; a second averaging circuit for calculating an average value of the basic matrix obtained in the second matrix acquiring circuit; a third averaging circuit for calculating an average value of the basic matrix obtained in the third matrix acquiring circuit; and a data array conversion circuit for converting the outputs of the first through third averaging circuits into a bayer array conversion matrix of two pixels×two pixels adjacent to each other on the solid-state image pick-up device; characterized in that: when the solid-state image pick-up device is an RGB independent array sensor-type solid-state image pick-up device for acquiring an R signal, a G signal, a B signal for each pixel, the R signal, G signal, B signal are inputted into the first through third matrix acquiring circuits, respectively.

First through third matrix acquiring circuits are those for acquiring a basic matrix of two-pixels×two-pixels adjacent to each other from the output signal of a solid-state image pick-up device. When a solid-state image pick-up device is an RGB independent array sensor-type solid-state image pick-up device for outputting R, G, B signals for each pixel, each of the R, G, B signals is individually outputted from the RGB independent array sensor-type solid-state image pick-up device, and inputted into the first through third matrix acquiring circuits, respectively. Thus, R signals on R, R, R - - - horizontal line can be captured for each unit of the basic matrix similar to bayer array. Similarly, G signals on G, G, G - - - horizontal line and B signals on B, B, B - - - horizontal line can be captured for each unit of the basic matrix. Thus, for each of the R, G, B signals inputted, the basic matrix of two×two pixels is acquired. The basic matrix is sequentially updated, whereby data for one frame of image is acquired.

First through third averaging circuits are provided correspondingly to the first through third matrix acquiring circuits to calculate average values of pixel signals in the basic matrix. Thus, one R signal can be acquired from the basic matrix of two×two pixels of the R signals, similarly to the solid-state image pick-up device in bayer array. Further, one G signal can be acquired from the basic matrix of two×two pixels of the G signals, and one B signal can be acquired from the basic matrix of two×two pixels of the B signals.

Data array conversion circuit coverts simultaneous signals (R, G, B signals) into a conversion matrix of two pixels×two pixels in bayer array (R, Gr, Gb, B signals), and outputs them to various circuit at the next step. Then, the conversion matrix is sequentially updated in response to the update of the basic matrix, whereby data in bayer array for one frame of image can be acquired. Here, various circuits at the next step can include, for example, a detection circuit for bayer array data for calculating appraisal values of white balance adjustment, focus adjustment, exposure adjustment and the like according to the conversion matrix.

According to another aspect of the invention, there is provided an image processing method comprising the steps of: acquiring a basic matrix of two pixels×two pixels adjacent to each other on a solid-state image pick-up device from an output signal of the solid-state image pick-up device; calculating an average value of the basic matrix obtained in the first matrix acquiring circuit; calculating an average value of the basic matrix obtained in the second matrix acquiring circuit; calculating an average value of the basic matrix obtained in the third matrix acquiring circuit; and converting the outputs of the first through third averaging circuits into a bayer array conversion matrix of two pixels× two pixels adjacent to each other on the solid-state image pick-up device; characterized in that: when the solid-state image pick-up device is an RGB independent array sensor-type solid-state image pick-up device for acquiring an R signal, a G signal, a B signal for each pixel, the R signal, G signal, B signal are inputted into the first through third matrix acquiring circuits, respectively.

The image processing circuit includes first through third image processing circuit blocks. Each of the first through third image processing circuits includes a matrix acquiring circuit, an averaging circuit, an output circuit, an input circuit, and a data array conversion circuit. An average value of basic matrixes is outputted from the output circuit of the first image processing circuit block, and inputted into the second and third image processing circuit blocks. Average values of basic matrixes outputted from the output circuit of the second and third image processing circuit blocks are inputted into the input circuit of the first image processing circuit block. Thus, three signals of R, G, B are inputted into the data array conversion circuit of the first image processing circuit block. Then, the data array conversion circuit converts the R, G, B signals inputted into conversion matrixes in bayer array of two-pixels×two-pixels adjacent to each other on the solid-state image pick-up device. Similarly thereafter, also in the data array conversion circuits of the second image processing circuit block and the third image processing circuit block, there are performed operations of converting the R, G, B signals thus inputted into conversion matrixes in bayer array. That is, in the first through third image processing circuit blocks, identical conversion matrixes are acquired.

Hereby, even when the solid-state image pick-up device in the so-called RGB independent array is used, independently inputted R, G, B signals can be captured for each basic matrix and then averaged, and thereafter converted into bayer array. Thus, even when the RGB independent array sensor-type solid-state image pick-up device is used, the next-step circuit for bayer array as an existing system can be used, and in addition, the data appraisal method and the software library having been grown for many years for bayer array can be used.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 6 is a schematic view of a bayer array sensor; and

DETAILED DESCRIPTION OF THE PREFERRED EMBODIMENTS

Figure 1:
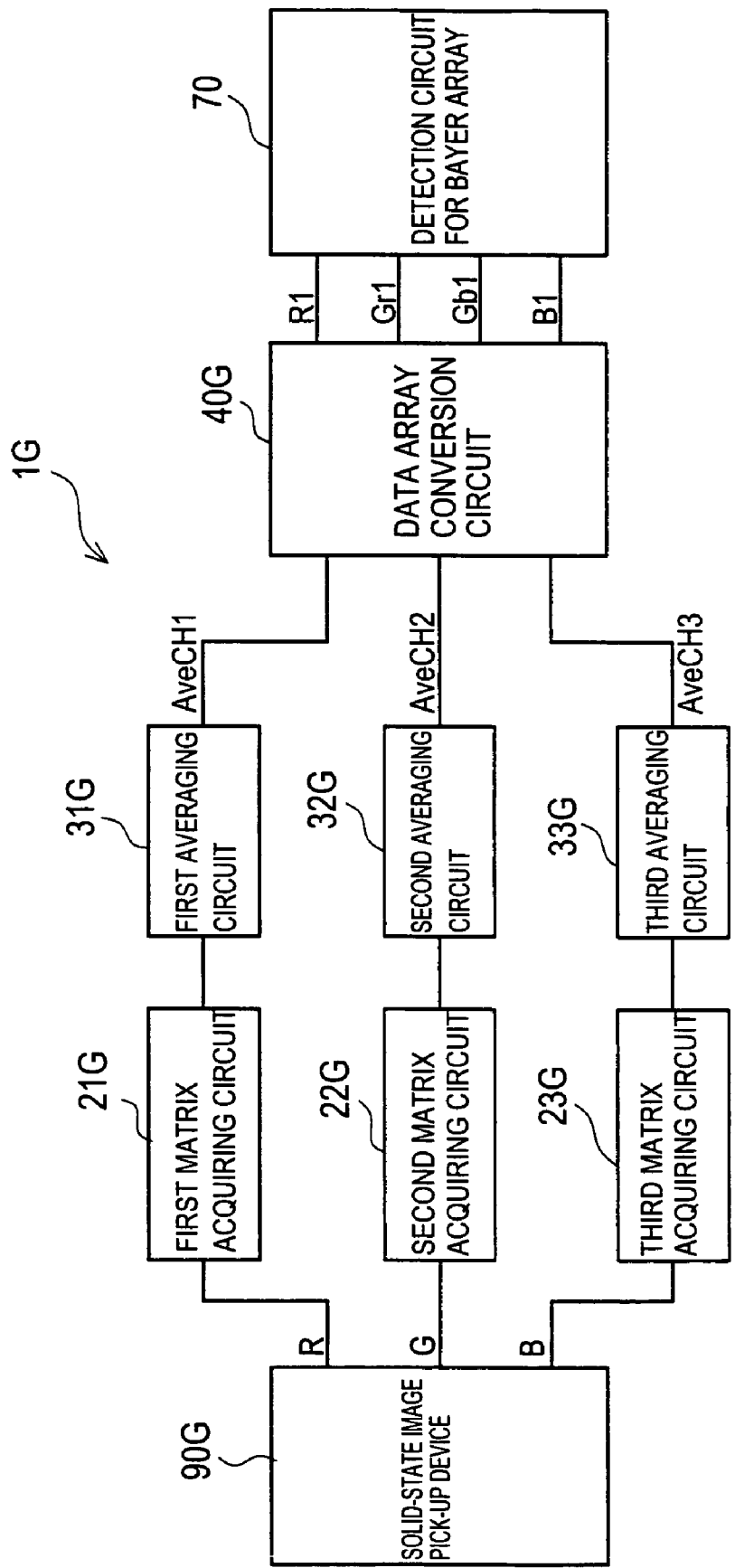
FIG. 1 is a principle diagram of the present invention.

Hereinafter, embodiments embodying image processing circuits and image processing methods of the present invention will be explained in detail with reference to drawings according to FIGS. 1 through 6. FIG. 1 shows a principle diagram of the present invention. An image processing system 1G includes a first matrix acquiring circuit 21G through a third matrix acquiring circuit 23G, a first averaging circuit 31G through a third averaging circuit 33G, a data array conversion circuit 40G, a detection circuit for bayer array 70, and a solid-state image pick-up device 90G.

The solid-state image pick-up device 90G is an RGB independent array sensor-type solid-state image pick-up device for acquiring R, G, B signals for each pixel, and outputs the R, G, B signals individually. The R signals are inputted into the first matrix acquiring circuit 21G; the G signals are inputted into the second matrix acquiring circuit 22G; and the B signals are inputted into the third matrix acquiring circuit 23G.

The first matrix acquiring circuit 21G acquires the R signal of the R, G, B signals outputted from the solid-state image pick-up devise 90G for each basic matrix. Here, the basic matrix means a region consisting of two pixels×two pixels adjacent to each other on the solid-state image pick-up devise 90G. The first averaging circuit 31G outputs an average value AveCH1 as an average value of the R signals of each pixel in the basic matrix. Thus, one R signal can be acquired for each basic matrix of two×two pixels. This has a similar relationship with the acquiring of one R signal in the matrix of two×two pixels in the solid-state image pick-up device in bayer array.

Similarly, the second matrix acquiring circuit 22G acquires the G signals for each basic matrix, and the second averaging circuit 32G outputs an average value AveCH2 of G signals. Also similarly, the third matrix acquiring circuit 23G acquires the B signals for each basic matrix, and the third averaging circuit 33G outputs an average value AveCH3 of B signals. Then, the basic matrixes are sequentially updated, whereby data for one frame of image is acquired.

The data array conversion circuit 40G converts the average value AveCH1 (R signal), the average value AveCH2 (G signal) and the average value AveCH3 (B signal) into conversion matrixes of two pixels×two pixels in bayer array (R1, Gr1, Gb1, B1 signals). In this conversion operation, the average value AveCH2 of the G signal is assigned to the Gr1 signal and Gb1 signal of the conversion matrix, whereby three signals of the average values AveCH1 through AveCH3 are converted into four signals of R1, Gr1, Gb1, B1 signals in bayer array. The R1, Gr1, Gb1, B1 signals thus obtained are inputted into the detection circuit for bayer array 70. The detection circuit for bayer array 70 is a detection circuit adapted for the input of image data in bayer array. With the detection circuit for bayer array 70, the R1, Gr1, Gb1, B1 signals of the conversion matrix are detected, whereby the calculation of appraisal values for white balance adjustment, focus adjustment, exposure adjustment and the like is performed.

Hereby, in the image processing system 1G, when the so-called RGB independent array sensor is used, the average value of the R signals, the average value of the G signals and the average value of the B signals can be acquired foe each basic matrix of two pixels×two pixels adjacent to each other on the solid-state image pick-up device 90G. Then, the three average values of the three signals of R, G, B signals thus obtained can be converted into the four signals of R1, Gr1, Gb1, B1 signals in bayer array. Hereby, even when the RGB independent array sensor is used for the solid-state image pick-up device 90G, the average values can be converted into the signals in bayer array, so that the detection operation can be performed using the detection circuit for bayer array 70 as an existing system. In this manner, it is understood that even when the RGB independent array sensor is used, the appraisal method such as white balance adjustment, focus adjustment and exposure adjustment, and the software library, having been grown for many years for bayer form, can be used.

Figure 2:
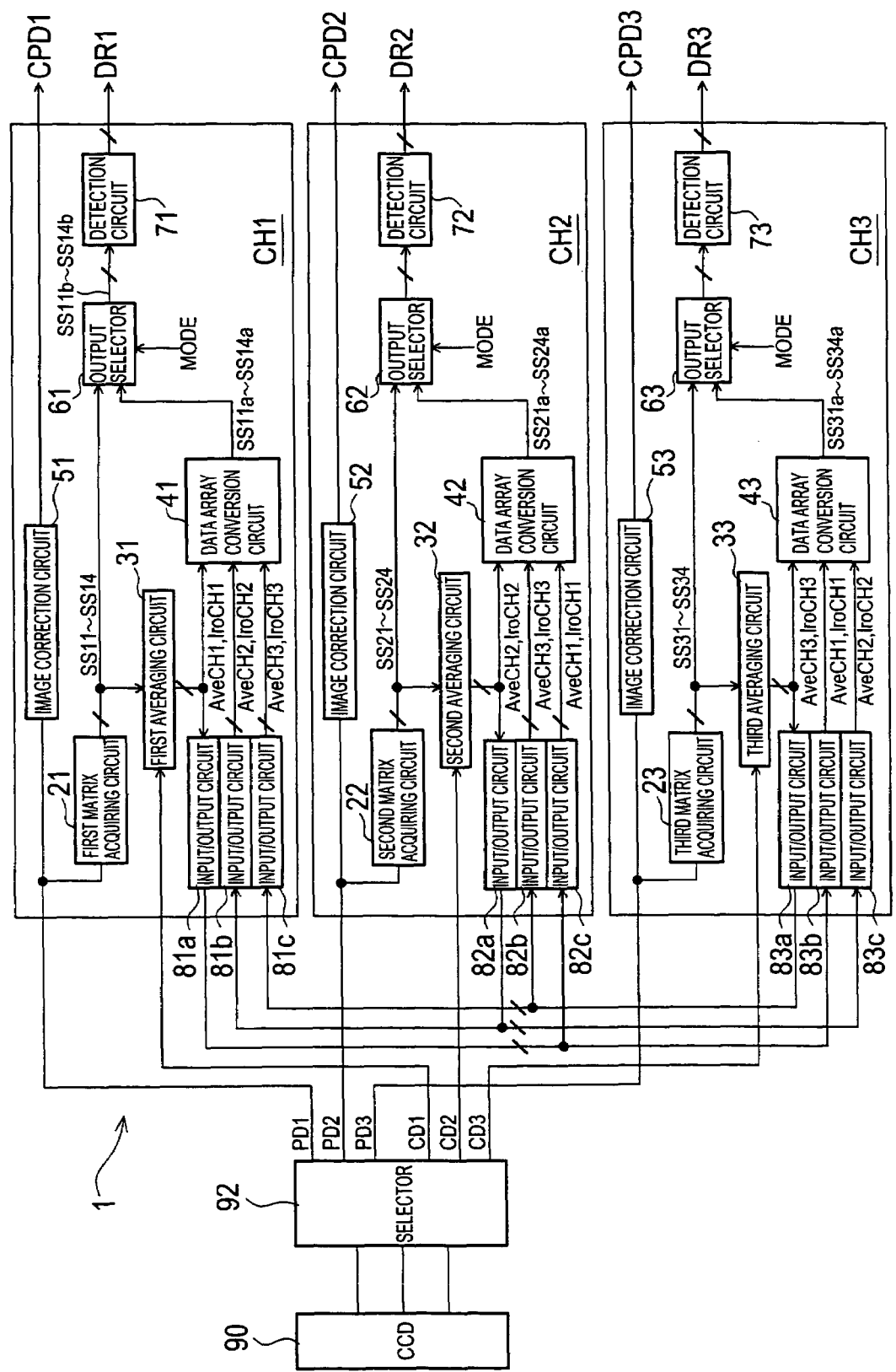
FIG. 2 is a circuit diagram of an image processing circuit 1.

An image processing circuit 1 in connection with the embodiments of the present invention will be explained using FIG. 2. The image processing circuit 1 includes a CCD 90, a selector 92, a first image processing circuit block CH1 through a third image processing circuit block CH3. The output terminal of the CCD 90 is connected to the selector 92. Pixel data PD1 through PD3, and color information CD1 through CD3 outputted from the selector 92 are inputted into the first image processing circuit block CH1 through the third image processing circuit block CH3, respectively.

The first image processing circuit block CH1 includes a first matrix acquiring circuit 21, a first averaging circuit 31, a data array conversion circuit 41, an image correction circuit 51, an output selector 61, a detection circuit 71, an input/output circuits 81a through 81c. The pixel data PD1 is inputted into the image correction circuit 51 and the first matrix acquiring circuit 21. In the image correction circuit 51, various corrections such as defective pixel correction, noise correction and OB (Optical Black) correction are performed on the pixel data PD1 thus inputted. Then, pixel data CPD1, after being corrected, from the image correction circuit 51 is outputted to a circuit, not shown, at the next step. In the circuit at the next step, an image of one frame is created. Signals SS11 through SS14 of two pixels×two pixels (basic matrix) adjacent to each other on the CCD 90 are outputted from the first matrix acquiring circuit 21. The signals SS11 through SS14 are inputted into the fist averaging circuit 31 and the output selector 61. The average value AveCH1 and color information IroCH1 are outputted from the first averaging circuit 31, and inputted into the input/output circuit 81a and the data array conversion circuit 41, The average value AveCH1 and color information IroCH1 are outputted from the input/output circuit 81a, and inputted into the input/output circuit 82c of the second image processing circuit block CH2 and the input/output circuit 83b of the third image processing circuit block CH3, respectively. Further, the color information CD1 outputted from the selector 92 is inputted into the first averaging circuit 31. Further, the average value AveCH2 and color information IroCH2 outputted from the second image processing circuit block CH2 are via the input/output circuit 81b into the data array conversion circuit 41. Further, the average value AveCH3 and color information IroCH3 outputted from the third image processing circuit block CH3 are via the input/output circuit 81c into the data array conversion circuit 41.

Signals SS11a through SS14a consisting of a conversion matrix of two pixels×two pixels after being converted into bayer array are outputted from the data array conversion circuit 41, and inputted into the output selector 61. Signals SS11b through SS14b are outputted from the selector 61, and inputted into the detection circuit 71. A detection result DR1 is outputted from the detection circuit 71.

Hereinafter, similarly, also in the second image processing circuit block CH2, color information CD2 is inputted into the second averaging circuit 32. Further, the average value AveCH2 and IroCH2 outputted from the second averaging circuit 32, the average value AveCH3 and color information IroCH3 outputted from the third image processing circuit block CH3, and the average value AveCH1 and color information IroCH1 outputted from the first image processing circuit block CH1 are inputted into the data array conversion circuit 42. Further, similarly, also in the third image processing circuit block CH3, color information CD3 is inputted into the third averaging circuit 33. Further, the average value AveCH3 and IroCH3 outputted from the third averaging circuit 33, the average value AveCH1 and color information IroCH1 outputted from the first image processing circuit block CH1, and the average value AveCH2 and color information IroCH2 outputted from the second image processing circuit block CH2 are inputted into the data array conversion circuit 43.

Figure 3:
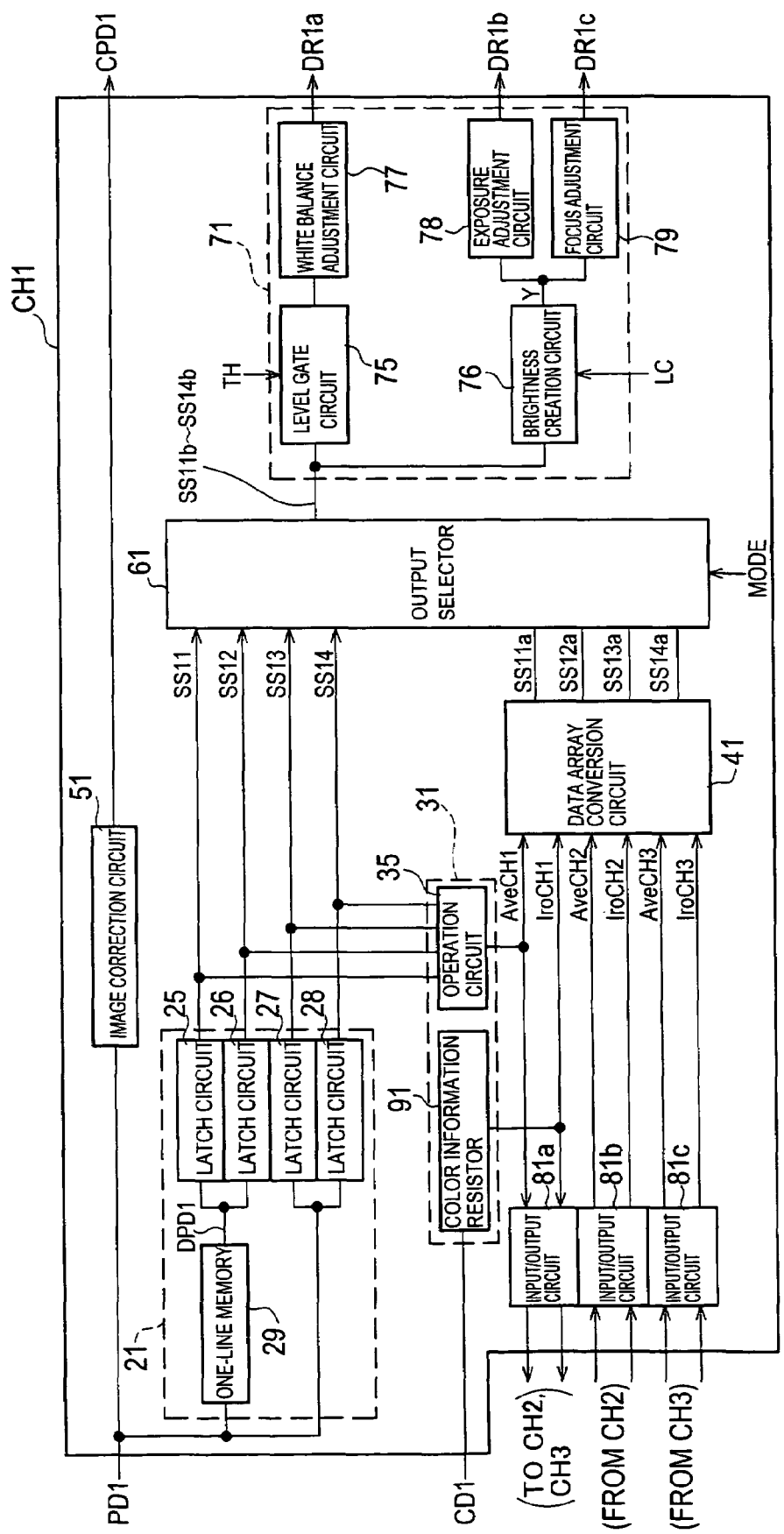
FIG. 3 is a circuit diagram of a first image processing circuit block CH1.

FIG. 3 shows a detailed circuit diagram of the first image processing circuit block CH1. The first matrix acquiring circuit 21 includes a one-line memory 29, latch circuits 25 through 28. The pixel data PD1 is inputted into the one-line memory 29 and the latch circuits 27, 28. Delay pixel data DPD1 is outputted from the one-line memory 29, and inputted into the latch circuits 25, 26. The signals SS11 through SS14 are outputted from the latch circuits 25 through 28, respectively.

The first averaging circuit 31 includes an operation circuit 35 and a color information resistor 91. The signals SS11 through SS14 are inputted into the operation circuit 35, while the AveCH1 is outputted from the operation circuit 35. The color information CD1 is inputted into the color information resistor 91, while the color information IroCH1 is outputted from the color information resistor 91.

The detection circuit 71 includes a level gate circuit 75, a brightness creation circuit 76, a white balance adjustment circuit 77, an exposure adjustment circuit 78, and a focus adjustment circuit 79. The signals SS11b through SS14b, and a threshold TH are inputted into the level gate circuit 75. The signals SS11b through SS14b passing though the level gate circuit 75 are inputted into the white balance adjustment circuit 77, while a detection result DR1a is outputted from the white balance adjustment circuit 77. The signals SS11b through SS14b, and a brightness coefficient LC are inputted into the brightness creation circuit 76. A brightness signal Y outputted from the brightness creation circuit 76 is inputted into an exposure adjustment circuit 78 and a focus adjustment circuit 79. Detection results DR1b and DR1c are outputted from the exposure adjustment circuit 78 and the focus adjustment circuit 79, respectively. Further, since the configuration of the second image processing circuit block CH2 and the third image processing circuit block CH3 is similar to that of the first image processing circuit block CH1, a detailed explanation will be omitted herein.

Figure 4:
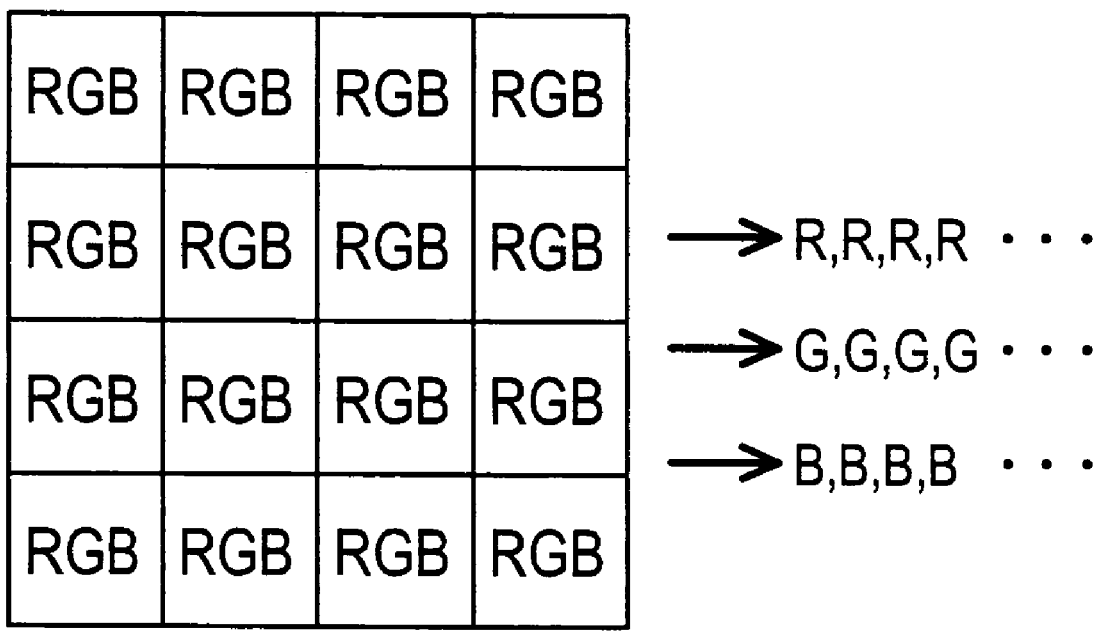
FIG. 4 is a schematic view of an RGB independent array sensor.

The operation of the image processing circuit 1 will be explained. First, a case where the CCD 90 is an RGB independent array sensor-type CCD will be explained. FIG. 4 shows a schematic view of the RGB independent array sensor. The RGB independent array sensor fetches all R, G, B colors by one pixel, and includes a data line for each R, G, B signal. Thus, the R, G, B signals are outputted in parallel with each other from the CCD 90, and inputted into the selector 92 (FIG. 2). In the selector 92, the R, G, B signals are assigned to the pixel data PD1 through PD3, respectively. In this embodiment, the R signals are assigned to the pixel data PD1, and the color information CD1 informs the first image processing circuit block CH1 of the effect. Similarly, the G signals are assigned to the pixel data PD2, and the color information CD2 informs the second image processing circuit block CH2 of the effect. Further, the B signals are assigned to the pixel data PD3, and the color information CD3 informs the third image processing circuit block CH3 of the effect.

In this manner, the selector 92 can specify arbitrarily color signals assigned to the first image processing circuit block CH1 through the third image processing circuit block CH3. Thus, for example, when the CCD 90 includes three output terminals for R, G, B signals, according to the arrangement position and array order of the particular terminals, color signals and RGB signals can be assigned to the first image processing circuit block CH1 through the third image processing circuit block CH3. Thus, there is a merit of making a flexible substrate layout possible.

Since a mode signal MODE inputted is made high level, the output selector 61 selects the output of the data array conversion circuit 41 to output it to the detection circuit 71. Thus, the mode of the image processing circuit 1 enters a mode corresponding to the RGB independent array sensor.

Figure 5:
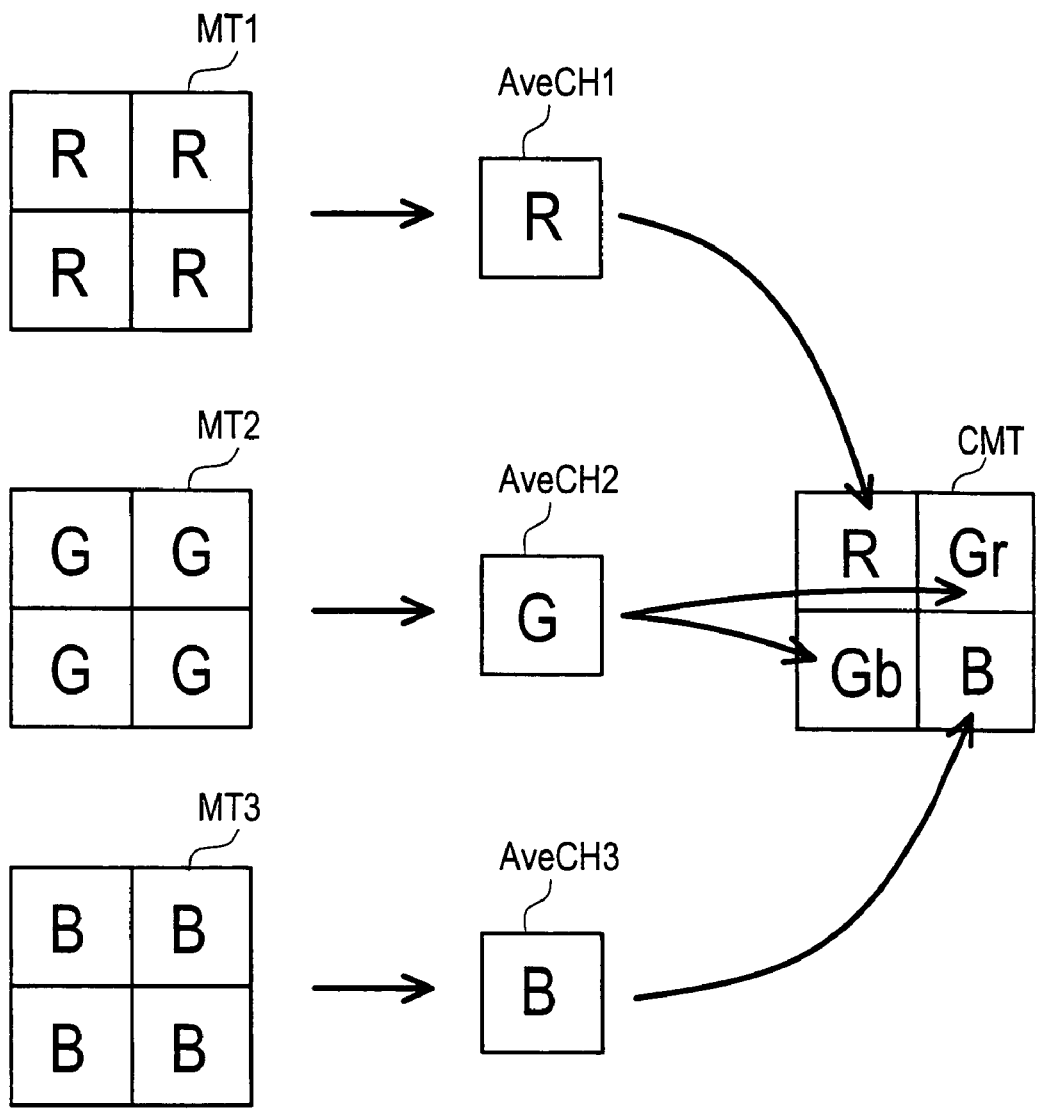
FIG. 5 is a view showing the operation of the first image processing circuit block CH1.
Figure 7:
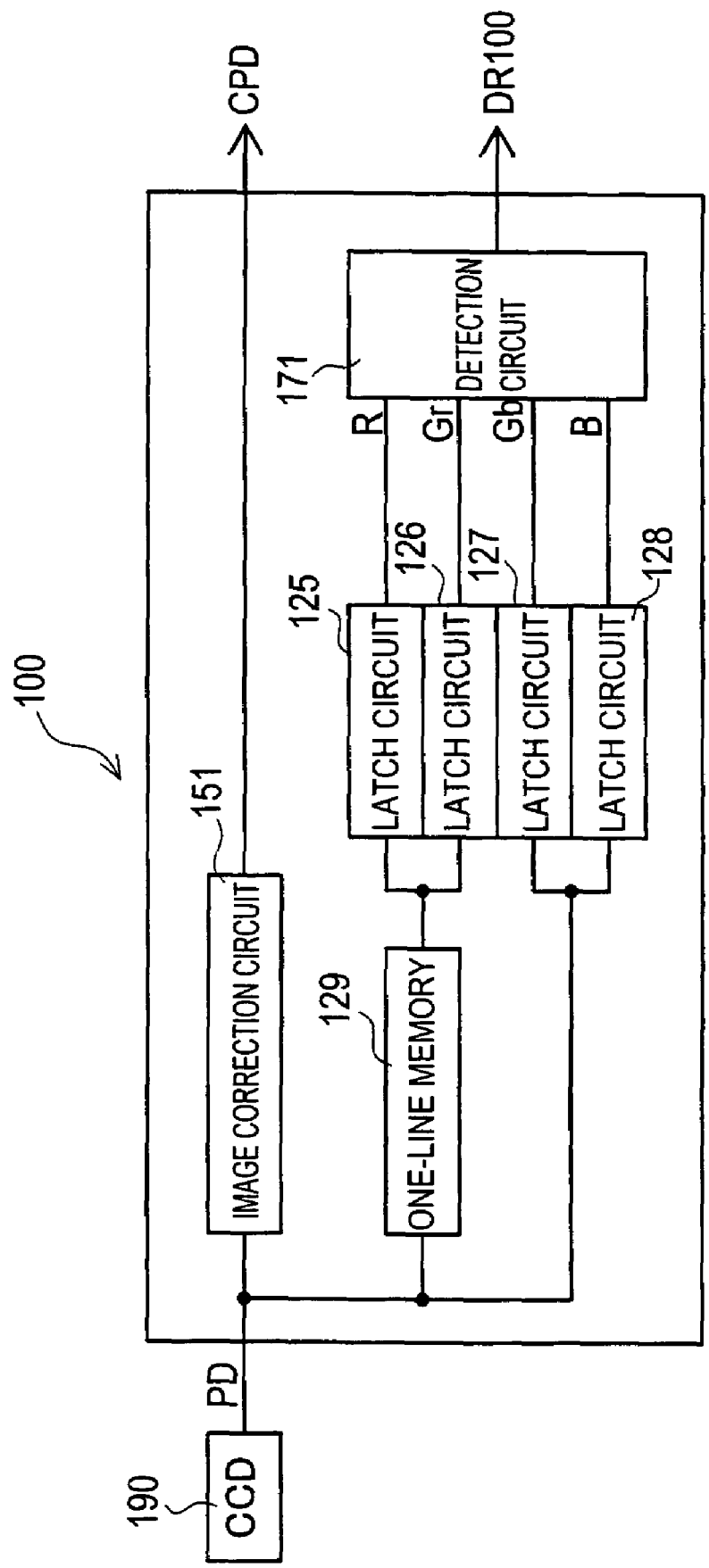
FIG. 7 is a circuit diagram of an image processing system 100 in connection with the prior art.

Thereafter, the operation of the first image processing circuit block CH1 will be explained using FIGS. 3 and 5. The R signals in R, R, R - - - for each line as the pixel data PD1 are inputted into the first image processing circuit block CH1. The first matrix acquiring circuit 21 holds the R signals on a one preceding line on the one-line memory 29. Furthermore, an operation is performed to synchronize the R signals on the current line inputted subsequently to the preceding line and the R signals on the preceding line stored on the one-line memory 29 with each other. Thus, the R signals for two pixels adjacent to each other on the preceding line are latched in the latch circuits 25, 26. The R signals for two pixels on the current line adjacent to the R signals on the preceding line latched in the latch circuits 25, 26 are latched in the latch circuits 27, 28. Hereby, as shown in FIG. 5, the R signals corresponding to a first basic matrix MT1 of two pixels×two pixels adjacent to each other on the CCD 90 are acquired in the latch circuits 25 through 28.

The signals SS11 through SS14 outputted from the latch circuits 25 through 28, respectively are inputted into the operation circuit 35. The operation circuit 35 calculates the average value AveCH1 of the signals SS11 through SS14 of R signals (FIG. 5). Then, the average value AveCH1 of the R signals is inputted into the data array conversion circuit 41 and the input/output circuit 81a. Further, since the color information CD1 indicating the R signal has been inputted into and held in the color information resistor 91, the color information resistor 91 outputs the color information IroCH1 to the data array conversion circuit 41 and the input/output circuit 81a.

Similarly to the above-mentioned operation, also in the second image processing circuit block CH2, G signals corresponding to a second basic matrix MT2 are acquired, and the average value AveCH2 of the G signals is calculated. Further, also in the third image processing circuit block CH3, B signals corresponding to a third basic matrix MT3 are acquired, and the average value AveCH3 of the B signals is calculated (FIG. 5). Further, as shown in FIG. 2, the average value AveCH2 and the color information IroCH2 of G signals outputted from the second image processing circuit block CH2 are via the input/output circuit 81b into the data array conversion circuit 41 of the first image processing circuit block CH1. Further, the average value AveCH3 and the color information IroCH3 of B signals outputted from the third image processing circuit block CH3 are via the input/output circuit 81c into the data array conversion circuit 41 of the first image processing circuit block CH1.

The data array conversion circuit 41 recognizes by the color information IroCH1 through IroCH3 that the average value AveCH1 is R signal, the average value AveCH2 is G signal, and the average value AveCH3 is B signal. Further, as shown in FIG. 5, the data array conversion circuit 41 converts the three signals of the average values AveCH1 through AveCH3 of the R, G, B signals into the conversion matrix CMT in bayer array consisting of two pixels×two pixels adjacent to each other. Although in this converting operation, the three signals of the average values AveCH1 through AveCH3 are converted into the four signals of the R, Gr, Gb, B signals in bayer array, this conversion is performed by converting the average value AveCH2 into the Gr signal and Gb signal of the conversion matrix CMT. Then the signals SS11a through SS14a corresponding to the R, Gr, Gb, B signals in bayer array are outputted from the data array conversion circuit 41.

The output selector 61 is a circuit which selects one of the signals SS11 through SS14 outputted from the first matrix acquiring circuit 21, and the signals SS11a through SS14a inputted from the data array conversion circuit 41, and outputs it as the signals SS11b through SS14b to the detection circuit 71. In this embodiment, since the mode signal MODE informs the output selector 61 of the effect that the CCD 90 is of the RGB independent array sensor type, the output selector 61 selects the signals SS11a through SS14a inputted from the data array conversion circuit 41, and then outputs them to the detection circuit 71.

In the detection circuit 71, detecting operation is performed. The level gate circuit 75 is a circuit which assumes as noise the data out of the range of the threshold TH, and masks it. The signals outputted from the level gate circuit 75 are inputted into the white balance adjustment circuit 77. The white balance adjustment circuit 77, which is a circuit for automatically adjusting the difference in color shade due to color temperature, calculates the integrated value of the R, G, B signals and then outputs the value as the detection result DR1a. Based on the detection result DR1a, in the next step circuit not shown, an operation is performed to correct the image data fetched and adjust the data to a natural color shade.

In the brightness creation circuit 76, according to the brightness coefficient LC inputted, the brightness signal Y is created. The brightness signal Y is the luminosity of image at the human's eyes. The brightness signal Y is inputted into the exposure adjustment circuit 78 and the focus adjustment circuit 79. The exposure adjustment circuit 78 is a circuit which has a function of picking up an image at a proper exposure so that the image does not exhibits over exposure or under exposure. The circuit calculates the integrated value of the brightness and outputs detection result DR1b. Based on the detection result DR1b, the exposure is controlled in the next step circuit not shown. The focus adjustment circuit 79 is a circuit which fetches a high-frequency component of an image, and according to the integrated value information, automatically adjusts the focus so that the focus is achieved (that is, there is more high-frequency component). From the above-mentioned fact, it is understood that the image processing circuit 1 can perform the detecting operation in the detection circuit 71 even when the CCD 90 is of the RGB independent array sensor type.

Further, when the image data in RGB independent array is converted into that in bayer array, the data is averaged, so that the data amount decreases to about a quarter. Therefore, the data array conversion circuit 41 is included at the step immediately before the detection circuit 71 requiring the data in bayer array. This allows another circuit not requiring the data format in bayer array to use the data in high-density-pixel RGB independent array as it is, thereby contributing to a highly detailed image data.

Hereafter, a case where the CCD 90 is a solid-state image pick-up device in bayer array will be explained. FIG. 6 shows a schematic view of the bayer array sensor. The bayer array sensor can fetch only one color by one pixel. Thus, the R, Gr, Gb, B signals are outputted serially from the CCD 90, and inputted into the selector 92 (FIG. 2). In the selector 92, an operation is performed to assign the data inputted from the CCD 90 to the pixel data PD1 through PD3. That is, all the pixel data PD1 through PD3 are made identical data.

Since a mode signal MODE inputted is made low level, the output selector 61 selects the output of the first matrix acquiring circuit 21 to output it to the detection circuit 71. Thus, the mode of the image processing circuit 1 enters a mode corresponding to the bayer array sensor.

The operation of the first image processing circuit block CH1 will be explained using FIG. 3. The R and Gr signal, and Gb and B signal as the pixel data PD1 every one line are alternately inputted into the first image processing circuit block CH1. The first matrix acquiring circuit 21 holds the R, Gr signals on a preceding line on the one-line memory 29. Then, an operation is performed to synchronize the Gb, B signals on the current line inputted subsequently to the preceding line and the R, Gr signals on the preceding line stored on the one-line memory 29 with each other. Hereby, the R, Gr, Gb, B signals corresponding to a first basic matrix MT1 of two pixels×two pixels adjacent to each other on the CCD 90 are acquired in the latch circuits 25 through 28.

The signals SS11 through SS14 outputted from the first matrix acquiring circuit 21 are inputted into the output selector 61. In this embodiment, since the mode signal MODE informs the output selector 61 of the effect that the CCD 90 is of the bayer array type, the output selector 61 selects the signals SS11 through SS14 inputted from the first matrix acquiring circuit 21, and then outputs them to the detection circuit 71. In the detection circuit 71, detecting operation is performed, and from the detection circuit 71 the detection results DR1a through DR1c are outputted. From the above-mentioned fact, it is understood that the image processing circuit 1 can perform the detecting operation in the detection circuit 71 even when the CCD 90 is of the bayer array type.

As explained above in detail, when the CCD 90 uses the so-called RGB independent array sensor, the image processing circuit 1 in connection with the embodiments of the present invention can acquires the average value of R signals, the average value of G signals, and the average value of B signals. The three signals of the R, G, B signals thus obtained can be converted into four signals of the R, Gr, Gb, B signals in bayer array. This has the similar relationship to that in the CCD in bayer array, the R, Gr, Gb, B signals are acquired from the matrix of two×two pixels. Thus, it is understood that even when the RGB independent array sensor is used, the signals can be converted into those in bayer array, so that the appraisal method such as white balance adjustment, focus adjustment and exposure adjustment, and the software library, having been grown for many years for bayer array, can be used.

Further, the first matrix acquiring circuit 21 can receives any one of the signal in bayer array and the signal of the RGB independent array sensor type. Then, when the CCD 90 is in bayer array, the output selector 61 can select the output of the first matrix acquiring circuit 21 to output it to the detection circuit 71, while when the CCD 90 is in RGB independent array, the output selector 61 can select the output of the data array conversion circuit 41 to output it to the detection circuit 71. This allows the image processing circuit 1 to perform detection even in one of the case where the CCD 90 is in RGB independent array, and the case where it is in bayer array, whereby the applicable range of the circuits of the present invention can be spread.

Further, it is appreciated that the present invention is not limited to the above-mentioned embodiments, and various improvements and modifications can be made within the scope not departing from the purpose of the present invention. Although in this embodiment, the operation of the data array conversion circuit 41 in the first image processing circuit block CH1 has been explained, also in the data array conversion circuit 42 in the second image processing circuit block CH2 and the data array conversion circuit 43 in the third image processing circuit block CH3, a similar operation to the above is performed. When the CCD 90 is the RGB independent array sensor, the signals SS11a through SS14a in bayer array inputted into the detection circuit 71, the signals SS21a through SS24a in bayer array inputted into the detection circuit 72, and the signals SS31a through SS34a in bayer array inputted into the detection circuit 73 become identical with each other. Therefore, in this case, it is sufficient that only the detection circuit 71 of the first image processing circuit block CH1 is allowed to be operated, and the operation of the detection circuit 72 of the second image processing circuit block CH2 and the detection circuit 73 of the third image processing circuit block CH3 are allowed to be stopped. Hereby, the detection operation can be performed while controlling the current consumption in the image processing circuit 1.

Also, it is appreciated that not limited to the case where the detection circuit 72 and the detection circuit 73 are stopped, the detection circuits 71 through 73 may be simultaneously with each other operated. In this case, the threshold TH and the brightness coefficient LC may be set at values different from each other in the respective detection circuits. Further, the parameters in detection of the white balance adjustment circuit 77, the exposure adjustment circuit 78, and the focus adjustment circuit 79 may be set at values different from each other in the respective detection circuits. This causes the three detection circuits 71 through 73 to be operated simultaneously, so that three kinds of detection results can be obtained during same period of time. Further, for example, if the three kinds of filter parameters of the focus adjustment circuit 79 are detected simultaneously, and the best result is employed from the three results, the optimization of the parameter will become possible in a short time. From the above-mentioned fact, it is understood that this contributes to a high-rate and a high-accurate detecting operation.

Further, when the CCD 90 is the bayer array sensor, all the pixel data PD1 through PD 3 inputted into the first image processing circuit block CH1 through the third image processing circuit block CH3 are made identical data. Therefore, in this case, if only the first image processing circuit block CH1 is made operated, and the operation of the second image processing circuit block CH2 and the third image processing circuit block CH3 is made stopped, the detecting operation will be possible to be performed while controlling the current consumption in the image processing circuit 1.

Further, it is appreciated that when the CCD 90 is the bayer array sensor, the first image processing circuit block CH1 through the third image processing circuit block CH3 may be simultaneously operated. In this case, it is sufficient to provide for such an embodiment that the region in which the pixel data is outputted from the CCD 90 is divided into, for example, three sub-regions of the upper, middle and lower of the image pick-up region, and the data are outputted in parallel to each other from respective sub-regions. The data outputted from the respective three sub-regions are assigned in the selector 92 (FIG. 2) to the pixel data PD1 through PD3, and the detecting operations are performed in parallel to each other in the first image processing circuit block CH1 through the third image processing circuit block CH3. This allows the data fetching from the CCD 90 to become high rated, as well as the pick-up by still cameras to be performed at a higher rate and continuously.

Further, although in this embodiment, the average value AveCH2 of G signals outputted from the second averaging circuit 32 of the second image processing circuit block CH2 is made the Gr signal and Gb signal of the conversion matrix CMT in the data array conversion circuit 41 of the first image processing circuit block CH1, whereby the RGB independent array is converted into bayer array, the present invention is not limited to this embodiment. For example, in the second averaging circuit 32 of the second image processing circuit block CH2, the average value AveCH21 of G signals for two pixels on the preceding line in the second basic matrix MT2, and the average value AveCH22 of G signals for two pixels on the current line may be calculated. Then, in the data array conversion circuit 41 of the first image processing circuit block CH1, the average value AveCH21 may be assigned to the signal Gr, while the average value AveCH22 may be assigned to the signal Gb. This allows the RGB independent array to be converted into bayer array without damaging the data.

Further, the CCD 90 is one example of solid-state image pick-up devises; the selector circuit is one example of the output selector 61; the detection circuits 71 through 73 are one example of first through third data processing circuits; the first image processing circuit block CH1 through the third image processing circuit block CH3 are one example of first through third image processing circuit blocks; the input/output circuits 81a through 83a are one example of output circuits; the input/output circuits 81b through 83b and 81c through 83c are one example of output circuits; and the selector 92 is one example of signal assigning circuits.

According to the image processing circuit and image processing method of the present invention, even when the so-called RGB independent array solid-state image pick-up device is used, various technologies such as the software library having been grown for many years for bayer array solid-state image pick-up device can be used, and in addition, the image processing circuit and image processing method capable of accommodating for bayer array solid-state image pick-up device can be provided.

What is claimed is:

1. An image processing circuit comprising:
   first through third matrix acquiring circuits for acquiring a basic matrix of two pixels by two pixels adjacent to each other on a solid-state image pick-up device from an output signal of the solid-state image pick-up device;
   a first averaging circuit for calculating an average value of the basic matrix obtained in the first matrix acquiring circuit;
   a second averaging circuit for calculating an average value of the basic matrix obtained in the second matrix acquiring circuit;
   a third averaging circuit for calculating an average value of the basic matrix obtained in the third matrix acquiring circuit; and
   a data array conversion circuit for converting the outputs of the first through third averaging circuits into a bayer array conversion matrix of two pixels by two pixels adjacent to each other on the solid-state image pick-up device; characterized in that: when the solid-state image pick-up device is an RGB independent array sensor-type solid-state image pick-up device for acquiring an R signal, a G signal, a B signal for each pixel, the R signal, G signal, B signal are inputted into the first through third matrix acquiring circuits, respectively.

2. An image processing circuit according to claim 1, characterized in that when the solid-state image pick-up device is of the RGB independent array sensor type, the data array conversion circuit converts the average value of the basic matrix of the G signal outputted from the second averaging circuit into a Gr signal and a Gb signal of the conversion matrix.

3. An image processing circuit according to claim 1, characterized in that the circuit includes a selector circuit:
   for selecting at least one of the outputs of the first through third matrix acquiring circuits, when the solid-state image pick-up device is of the bayer array type; and
   for selecting the output of the data array conversion circuit, when the solid-state image pick-up device is of the RGB independent array sensor type.

4. An image processing circuit characterized in that the circuit includes first through third image processing circuit blocks each of which comprises:
   a matrix acquiring circuit for acquiring a basic matrix of two pixels by two pixels adjacent to each other on a solid-state image pick-up device from an output signal of the solid-state image pick-up device;
   an averaging circuit for calculating an average value of the basic matrix for one signal of an R signal, a G signal, a B signal obtained in the matrix acquiring circuit, when the solid-state image pick-up device is an RGB independent array sensor-type solid-state image pick-up device for acquiring the R signal, G signal, B signal for each pixel;
   an output circuit for outputting the output of the averaging circuit to an external section of an image processing circuit block;
   an input circuit into which the output of the averaging circuit for the other two signals of the R, G, B signals in the other image processing circuit blocks is inputted; and a data array conversion circuit for converting the output of the averaging circuit and the output of the input circuit which are inputted to the data array conversion into a bayer array conversion matrix of two pixels by two pixels adjacent to each other on the solid-state image pick-up device.

5. An image processing circuit according to claim 4, characterized in that the circuit includes the first through third image processing circuit blocks each of which comprises a selector circuit:
   for selecting the output of the matrix acquiring circuits, when the solid-state image pick-up device is of the bayer array type; and
   for selecting the output of the data array conversion circuit, when the solid-state image pick-up device is of the RGB independent array sensor type.

6. An image processing circuit according to claim 4, characterized in that when the solid-state image pick-up device is of the RGB independent array sensor type, at least one of the data array conversion circuits included in the respective first through third image processing circuit blocks is stopped.

7. An image processing circuit according to claim 4, characterized in that when the solid-state image pick-up device is of the bayer array type, at least one of the first through third image processing circuit blocks is stopped.

8. An image processing circuit according to claim 4, characterized in that the circuit includes a signal assigning circuit which is provided on a path connecting the solid-state image pick-up device with the first through third image processing circuit blocks, and which assigns in a predetermined order the R signal, G signal, B signal to the matrix acquiring circuit of the first through third image processing circuit blocks when the solid-state image pick-up device is of the RGB independent array sensor type.

9. An image processing method comprising the steps of:
acquiring a basic matrix of two pixels by two pixels adjacent to each other on a solid-state image pick-up device from an output signal of the solid-state image pick-up device;
calculating an average value of the basic matrix obtained in the first matrix acquiring circuit;
calculating an average value of the basic matrix obtained in the second matrix acquiring circuit;
calculating an average value of the basic matrix obtained in the third matrix acquiring circuit; and
converting the outputs of the first through third averaging circuits into a bayer array conversion matrix of two pixels by two pixels adjacent to each other on the solid-state image pick-up device; characterized in that:
when the solid-state image pick-up device is an RGB independent array sensor-type solid-state image pick-up device for acquiring an R signal, a G signal, a B signal for each pixel, the R signal, G signal, B signal are inputted into the first through third matrix acquiring circuits, respectively.

* * * * *